(12) United States Patent
Wuebbeling et al.

(10) Patent No.: US 9,937,457 B2
(45) Date of Patent: Apr. 10, 2018

(54) CYCLONE SEPARATOR AS WELL AS FILTERING DEVICE WITH CYCLONE SEPARATOR

(71) Applicant: MANN+HUMMEL GMBH, Ludwigsburg (DE)

(72) Inventors: Martin Wuebbeling, Mannheim (DE); Andrew Glynn, Schoenborn (DE); Juergen Schmitt, Hanhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 56 days.

(21) Appl. No.: 14/723,867

(22) Filed: May 28, 2015

(65) Prior Publication Data

US 2015/0343366 A1   Dec. 3, 2015

(30) Foreign Application Priority Data

Jun. 2, 2014   (DE) .................. 10 2014 007 814

(51) Int. Cl.

| | |
|---|---|
| *B01D 50/00* | (2006.01) |
| *B01D 46/00* | (2006.01) |
| *B04C 3/04* | (2006.01) |
| *B01D 45/12* | (2006.01) |
| *B01D 45/16* | (2006.01) |
| *B04C 3/06* | (2006.01) |
| *F02M 35/022* | (2006.01) |
| *F02M 35/02* | (2006.01) |

(Continued)

(52) U.S. Cl.
CPC .......... *B01D 50/002* (2013.01); *B01D 45/12* (2013.01); *B01D 45/16* (2013.01); *B01D 46/0002* (2013.01); *B04C 3/04* (2013.01); *B04C 3/06* (2013.01); *F02M 35/0215* (2013.01); *F02M 35/0223* (2013.01); *A47L 9/1608* (2013.01); *B04C 5/13* (2013.01)

(58) Field of Classification Search
CPC .. B01D 50/002; B01D 45/16; B01D 46/0002; B01D 45/12; F02M 35/0215; F02M 35/0223; B04C 3/06; B04C 3/04; B04C 5/13; A47L 9/1608
See application file for complete search history.

(56) References Cited

U.S. PATENT DOCUMENTS

| | | | | |
|---|---|---|---|---|
| 2,662,610 A | * | 12/1953 | Heinrich .................. | B04C 3/04 55/347 |
| 3,915,679 A | * | 10/1975 | Roach ...................... | B04C 3/06 55/347 |

(Continued)

FOREIGN PATENT DOCUMENTS

| | | |
|---|---|---|
| CN | 101905196 A1 | 12/2010 |
| DE | 102011121630 A1 | 6/2013 |
| DE | 102012007308 A1 | 6/2013 |

*Primary Examiner* — Dung H Bui
(74) *Attorney, Agent, or Firm* — James Hasselbeck

(57) ABSTRACT

A cyclone separator for separating liquid and/or solid particles from a fluid is provided with three or more cyclone cells that each have a cell pipe provided with a guiding device. The guiding devices cause the fluid to rotate and to separate the particles from the fluid by the rotation of the fluid. The cell pipes each have a particle exit opening for letting out the particles that have been separated by rotation from the fluid. One or more particle outlets are provided to discharge from the cyclone separator the particles that have exited from the cell pipes.

16 Claims, 3 Drawing Sheets

(51) Int. Cl.
*B04C 5/13* (2006.01)
*A47L 9/16* (2006.01)

(56) References Cited

U.S. PATENT DOCUMENTS

| | | | | |
|---|---|---|---|---|
| 4,394,145 A * | 7/1983 | Sundseth | | B01D 45/16 55/347 |
| 4,537,608 A * | 8/1985 | Koslow | | B01D 50/002 55/337 |
| 4,702,846 A * | 10/1987 | Ryynanen | | B01D 45/12 209/722 |
| 5,403,367 A * | 4/1995 | De Villiers | | B01D 39/1615 55/320 |
| 5,779,746 A * | 7/1998 | Buchanan | | B01D 45/12 55/452 |
| 7,799,106 B2 | 9/2010 | Rother et al. | | |
| 8,262,761 B2 * | 9/2012 | Babb | | B01D 45/16 29/525.11 |
| 2002/0144931 A1 * | 10/2002 | Sechrist | | B04C 3/04 208/113 |
| 2003/0057151 A1 * | 3/2003 | Kopec | | B04C 3/04 210/512.2 |
| 2009/0139192 A1 * | 6/2009 | Sams | | B01D 45/12 55/418 |
| 2010/0064643 A1 * | 3/2010 | Greif | | B01D 45/16 55/321 |
| 2010/0275561 A1 * | 11/2010 | Lundquist | | B04C 3/00 55/456 |
| 2013/0031878 A1 * | 2/2013 | Menssen | | B01D 45/16 55/345 |
| 2013/0152522 A1 * | 6/2013 | Stippich | | B01D 45/16 55/398 |
| 2013/0152525 A1 | 6/2013 | Brandner | | |
| 2014/0165513 A1 * | 6/2014 | Oelpke | | F02M 35/0216 55/385.1 |
| 2015/0273484 A1 * | 10/2015 | Ho | | B01D 45/16 55/321 |

* cited by examiner

CYCLONE SEPARATOR AS WELL AS FILTERING DEVICE WITH CYCLONE SEPARATOR

BACKGROUND OF THE INVENTION

The invention concerns a cyclone separator for separating liquid and/or solid particles from a fluid, in particular from a gas stream. The invention further concerns a filtering device, in particular air filter for a power engine or a compressed air compressor, comprising a filter housing with a raw-side inlet and a clean-side outlet for the medium to be filtered.

Cyclone separators, also referred to as cyclone, cyclone filter or centrifugal separator, serve for separating solid or liquid particles contained in fluids. A fluid which is flowing into a cyclone cell is guided in such a way that centrifugal forces accelerate the particles that are to be separated from the fluid in outward direction and feed them to a particle exit opening of the respective cyclone cells. For generating the centrifugal forces, guiding devices or guiding apparatus are used which comprise guide vanes that generate a turbulent flow within a cell pipe of the respective cyclone cells. Each cyclone separator comprises at least one particle outlet so that the separated particles can exit from the cyclone separator. For supporting discharge of the particles from the cyclone separator, the particles can be sucked away at the particle outlet by negative pressure by means of a suction device. For this purpose, a blower, a pump or an ejector can be provided. In this way, the degree of separation is even further improved.

The publication DE 10 2011 121 630 A1 discloses a cyclone separator of the aforementioned kind. In order to better control the negative pressures present at the cyclone separator, this known cyclone separator has two adjacently arranged particle outlets.

Still, it may happen, in particular in case of multi-cell cyclones or multi-cyclones in which a plurality of cyclone cells are arranged adjacent and above each other, that the separated particles cannot be discharged sufficiently and accumulate within the cyclone separator. Such particle accumulations can lead to clogging of individual cyclones and thus cause a drop in the degree of separation of the cyclone separator.

In order to avoid dust accumulations within the cyclone separator, the publication DE 10 2012 007 308 A1 proposes to provide only two cyclone cells instead of a plurality of cyclone cells. The guiding devices of the two cyclone cells disclosed in the publication DE 10 2012 007 308 A1 cause rotation in opposite directions. The particle outlet is configured such that the exhaust air streams exiting from the cyclone cells and containing the separated particles are combined to a common exhaust air stream and discharged from the cyclone separator.

Moreover, the publication CN 101905196 A1 discloses a dual cyclone with two cyclone cells causing rotation in opposite directions.

SUMMARY OF THE INVENTION

The invention has the object to further develop a cyclone separator of the aforementioned kind as well as a filtering device of the aforementioned kind such that particle accumulations within the cyclone separator can be reliably prevented.

This object is solved by a cyclone separator comprising at least three cyclone cells that each comprise a cell pipe with a guiding device for separating the particles from the fluid, wherein the guiding device is designed to cause the fluid to rotate and wherein the cell pipes each comprise at least one particle exit opening for letting out the particles that have been separated by rotation, and further comprising at least one particle outlet that is designed to discharge from the cyclone separator the particles that have exited from the cell pipes.

The object is solved for the filtering device of the aforementioned kind in that a cyclone separator as disclosed above is arranged in the area of the inlet of the filter housing and is embodied as a prefilter.

Advantageous embodiments and expedient further developments of the present invention are characterized in the respective dependent claims.

The invention concerns a cyclone separator for separating liquid and/or solid particles from a fluid, in particular from a gas stream, comprising—at least three cyclone cells which, for separation of the particles from the fluid, each comprise a cell pipe with a guiding device, wherein the guiding device is designed to cause the fluid to rotate and wherein the cell pipes comprise each at least one particle exit opening for letting out the particles separated by rotation, and at least one particle outlet that is configured to discharge the particles that have exited from the cell pipes out of the cyclone separator.

According to a preferred aspect, the invention is based on the guiding device of at least one of the cyclone cells causing rotation in opposite direction in order to avoid particle accumulation within the cyclone separator.

The number of counter-rotating cyclone cells can be less than the number of cyclone cells that are non counter-rotating, in particular the ratio of counter-rotating cyclone cells to cyclone cells that are non counter-rotating can be approximately one to ten up to approximately four to ten, or one to one.

As a result of gravity, the particles collect primarily in the lower area of the cyclone separator. In an advantageous embodiment of the invention, the at least one counter-rotating cyclone cell is therefore arranged in a lower area of the cyclone separator.

This arrangement has the advantage that the location and quantity of accumulation of particles in the cyclone separator can be affected by the ejection direction of the particles out of the individual cyclones cells. For a targeted control of the ejection direction of the particles, optionally the particle exit openings can be oriented appropriately, for example, can be oriented toward the particle outlet.

According to a particularly advantageous embodiment of the invention, the number of counter-rotating cyclone cells and/or the position of the counter-rotating cyclone cells in the cyclone separator and the orientation of the particle exit openings of the respective cyclone cells is selected such that particle accumulations in the cyclone separator are avoided reliably.

In order to effectively avoid a particle accumulation, the at least one counter-rotating cyclone cell is preferably arranged in an area of the cyclone separator which is located in the ejection direction of the particles exiting from the particle exit openings of the non-counter-rotating cyclone cells.

The ejection direction of the particles exiting from the particle exit openings is affected by the rotation direction of the guiding device and the arrangement of the particle exit opening. Advantageously, the arrangement of the at least one counter-rotating cyclone cell in the cyclone separator is therefore selected as a function of the orientation of the particle exit openings of the non-counter-rotating cyclone cells and the rotation direction of the guiding device of the non-counter-rotating cyclone cells.

When the particle exit opening, for example, is oriented downwardly in the direction of gravity and the guiding device is causing left-hand rotation, the ejection direction of the particles is oriented downwardly to the left. Advantageously, in this embodiment the guiding device of at least one of the cyclone cells arranged in the lower left area of the cyclone separator is causing rotation in opposite direction, i.e., in the example right-hand rotation.

Moreover, it is possible that approximately half of the cyclone cells are designed as counter-rotating cyclone cells. For example, the cyclone cells can be embodied alternatingly as counter-rotating cyclone cells and non-counter-rotating cyclone cells. Alternatively, the rotational directions of the cyclone cells can be correlated with the geometric halves of the cyclone separator.

The cyclone cells can be, for example, embodied according to inline cyclone design in which the raw air stream to be cleaned is supplied axially through a cylindrical main pipe. As the raw air stream enters the main pipe, the air stream is caused to rotate by means of a guiding device at the inlet side. In this way, a screw-like course is imparted onto the raw air stream. The particles contained in the raw air stream are transported by centrifugal force radially outwardly in the direction of the wall of the main pipe and will accumulate thereat. A separation of the flow that is laden more strongly with particles from the flow that is less strongly laden with particles—in other words, the separation of the raw air stream into a clean air stream and an exhaust air stream—can be realized, for example, by means of an immersion pipe which is provided with a smaller diameter than the main pipe and projects into the latter at the exit side axially and concentrically. The clean air stream, i.e., the air which is less laden with particles, passes in the interior through the immersion pipe and exits from the exit opening of the separating device. The exhaust air stream, i.e., the air which is laden more strongly with particles, is discharged through a particle exit opening arranged in the wall of the main pipe from the respective cyclone cell.

Instead of the aforementioned inline cyclone design, the cyclone cells can also be designed as spiral cyclone cells, respectively. In such spiral cyclone cells, the flow is guided through a channel with a spiral-shaped course wherein the channel wall forms the guiding apparatus.

A person skilled in the art will appreciate the present invention in particular when the cyclone separator is embodied as a multi-cell cyclone or multi-cyclone, in particular as a multi-cell cyclone which is horizontally arranged in the position of use. The problem of particle accumulation occurs in the prior art in particular in multi-cyclones that are horizontally arranged in the position of use.

According to a further embodiment, the particle outlet comprises a discharge pipe which is in gas-conducting communication with the particle exit openings. The discharge pipe can be designed in the form of a discharge socket. The discharge pipe can be connected to a suction device such as a blower, a pump or an ejector, as described above, for assisting in the discharge action.

The particle outlet is preferably designed to guide the particles, which have exited from the cell pipes in a discharge direction positioned perpendicular to the longitudinal axis of the cell pipes, out of the cyclone separator. The particle outlet is thus advantageously oriented transverse to the flow direction of the fluid, in particular in the direction of gravity.

The cyclone cells are advantageously aligned in the flow direction of the fluid and parallel to each other.

Advantageously, the particle outlet can be produced by injection molding by means of interchangeable inserts. This reduces the manufacturing costs of the cyclone separator.

A further advantageous defining feature of the present invention relative to the prior art is that the cyclone separator comprises at least two particle outlets in an advantageous embodiment. This serves also for improving the particle discharge from the cyclone separator.

In a preferred embodiment, the ejection direction of the non-counter-rotating cyclone cells and of the counter-rotating cyclone cells, or at least of a respective multitude of these cells, is oriented in the direction of the particle outlet or the particle outlets and/or in the direction of the center of the cyclone separator. This means that the horizontal component of the ejection direction is preferably oriented in the direction of the horizontal center of the cyclone separator and/or the respective horizontal position of the particle outlet that is closest to the respective cyclone cell.

The particle outlets are advantageously uniformly distributed across the width of the cyclone separator. Accordingly, the distance of the particles that are ejected respectively from the cyclone cells to the closest particle outlet is kept as minimal as possible. Alternatively, the particle outlets are arranged centrally on a long side or a short side of the housing of the cyclone separator.

In this context, the particle outlets can be arranged parallel to each other.

Preferably, the particle outlets of the cyclone separator are distributed uniformly across the total width of the housing of the cyclone separator such that a similar negative pressure, or the same negative pressure, can be generated at the respective cyclone cells.

The further or second particle outlet can have a blanking element for blanking the further or second particle outlet. Accordingly, the cyclone separator can be used in an application with suction action in which the particles at the particle outlet are sucked away by negative pressure by means of a suction device as well as in an application without suction action.

The present invention improves the particle discharge out of the cyclone separator and makes thus obsolete a separate particle or dust collection chamber which is usually arranged about a plurality of cyclone cells. The housing can thus enclose the cyclone cells immediately, i.e., without an intermediately positioned dust collecting chamber. A further advantage of the present invention is thus that the cyclone separator, in comparison to the prior art, can be designed to be smaller and more compact. The cyclone separator of the present invention, in comparison to the prior art, can thus be installed better and provides reduced manufacturing costs.

The present invention concerns moreover the use of a cyclone separator according to the aforementioned kind as a pre-separator for an air filtering system of an internal combustion engine, for example, for a construction machine, for example, for a skid loader or for a backhoe loader or for a forklift, or for an agricultural machine, for example, for a tractor, or for a mobile or stationary compressor or for a vehicle or a machine in horticulture and landscaping or for a stationary machine for energy generation.

BRIEF DESCRIPTION OF THE DRAWINGS

As already mentioned above, there are various possibilities to configure and further develop the teaching of the present invention in an advantageous way. For this purpose, on the one hand, reference is being had to the dependent claims of claim 1; on the other hand, further embodiments, features, and advantages of the present invention will be explained in more detail inter alia with the aid of the embodiment illustrated in FIG. 1 to FIG. 5.

Same or similar configurations, elements or features are provided in FIGS. 1 to 5 with identical reference characters.

DESCRIPTION OF PREFERRED EMBODIMENTS

Figure 1:
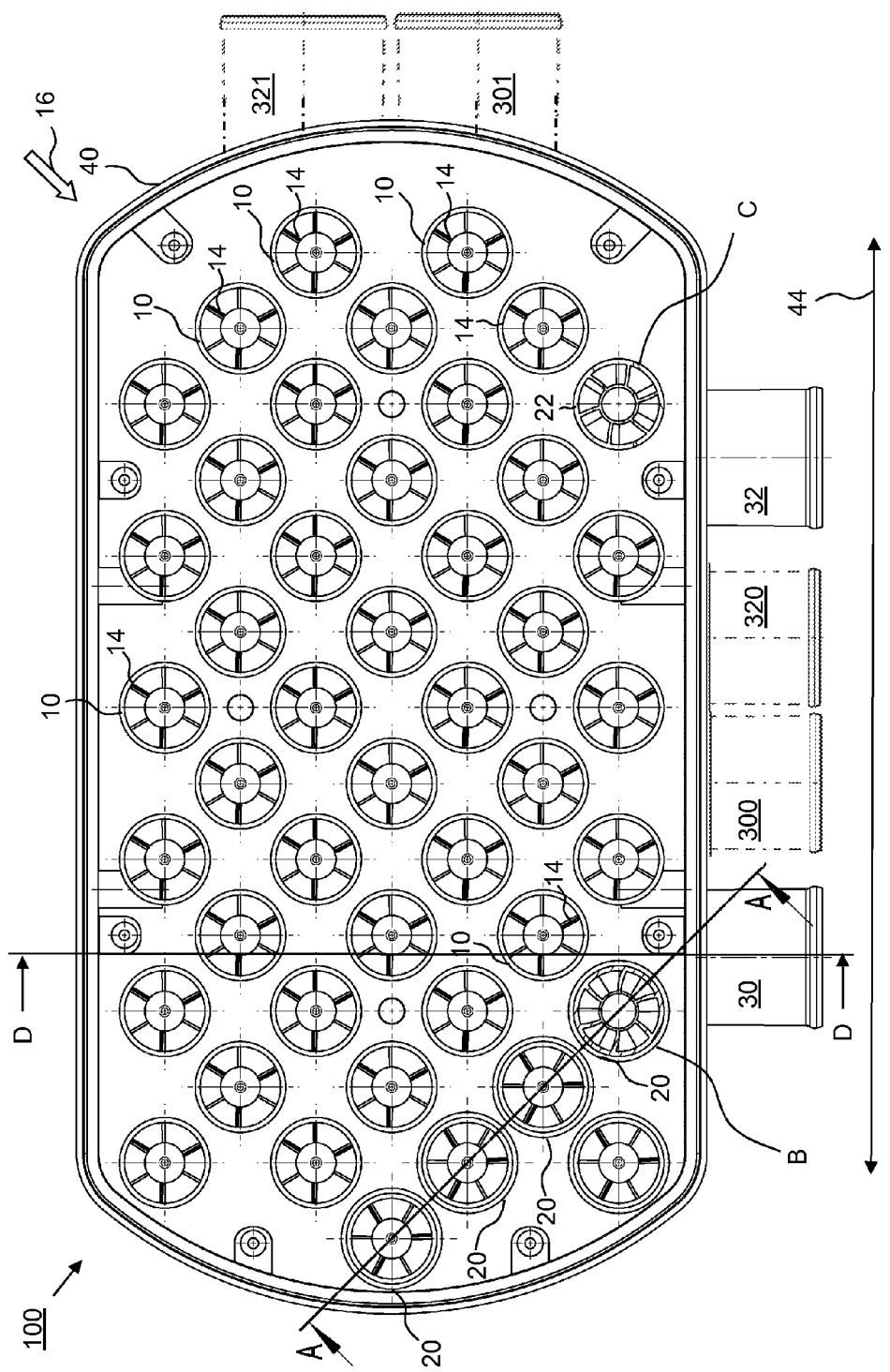
FIG. 1 shows in longitudinal section illustration an embodiment for a cyclone separator according to the present invention.

FIG. 1 shows a cyclone separator 100 for separating liquid and/or solid particles from a fluid, i.e., a pre-separator designed as a multi-cyclone for an air filter of a power engine. This multi-cyclone 100 has a plurality of cyclone cells, including first cyclone cells 10 and second cyclone cells 20, that for separating of the particles from the fluid each comprise a cell pipe 12, 22 with a guiding device 14, 24. The guiding device 14, 24 is designed to cause the fluid to rotate and the cell pipes 12, 22 each comprise at least one particle exit opening for letting out the particles separated by the rotation.

Moreover, the cyclone separator 100 has preferably two particle outlets 30, 32 (alternatively 300 and 320 or 301 and 321) that are designed to guide the particles that have exited from the cell pipes 12, 22 out of the cyclone separator 100, wherein the particles exiting from the particle exit openings preferably are collected first in a dust collecting chamber 34 (see FIG. 3) and are discharged from the latter by means of particle outlets, for example, by means of gravity and/or by means of a suction action. The particle outlets 30, 32 are, for example, parallel to each other and distributed uniformly across the width 44 of the cyclone separator 100.

FIG. 1 shows thus a cyclone separator 100 with dual dust discharge. Alternatively, two directly adjacently arranged particle outlets can be provided preferably centrally on one side of the cyclone separator 100, as is shown in the alternative arrangements of particle outlets 300 and 320 on a long side of the housing 40 or particle outlets 301 and 321 on a short side of the housing 40. These arrangements are in particular advantageous in case of non-existing suction action because the centrally arranged dust discharge helps to avoid dust accumulation in the dust collecting chamber 34 in mobile operation of the cyclone separator 100 with vibration. The arrangement of the particle outlets 301 and 321 at the short side of the housing 40 is required for a corresponding installation in an upright arrangement. The aforementioned arrangements are advantageous because the risk of blockage of the cyclone cells closest to the particle outlets 30, 300, 301 and 32, 320, 321 is reduced and therefore a reduced spacing between cyclone cells and the wall of the housing 40 can be selected.

The second cyclone cells 20 which are marked in FIG. 1 with the line A-A are preferably designed as counter-rotating cyclone cells 20 wherein the guiding device 24 of these counter-rotating cyclone cells 20 is designed to cause the fluid to rotate in counter-rotation (second rotation direction) relative to the first rotation direction of the fluid of the non-counter-rotating first cyclone cells 10. In the embodiment illustrated in FIG. 1, there are thus four cyclone cells embodied as counter-rotating cyclone cells 20.

The present invention provides preferably that the rotation direction of certain cyclone cells is changed in order to avoid particle accumulations in the multi-cyclone. In detail, in the illustrated embodiment the rotation direction of four cyclone cells 20 arranged in the lower left corner area of the multi-cyclone 100 has been changed to left-hand rotation relative to the right-hand rotation of first cyclone cells 10.

The present invention provides in comparison to the prior art the following advantages:

the cyclone separator has a reduced tendency to suffer a drop in efficiency the operative reliability of the cyclone cells 10, 20 is increased the installation of the cyclone separator 100 is improved, and the manufacturing costs are reduced.

While specific embodiments of the invention have been shown and described in detail to illustrate the inventive principles, it will be understood that the invention may be embodied otherwise without departing from such principles.

Figure 2:
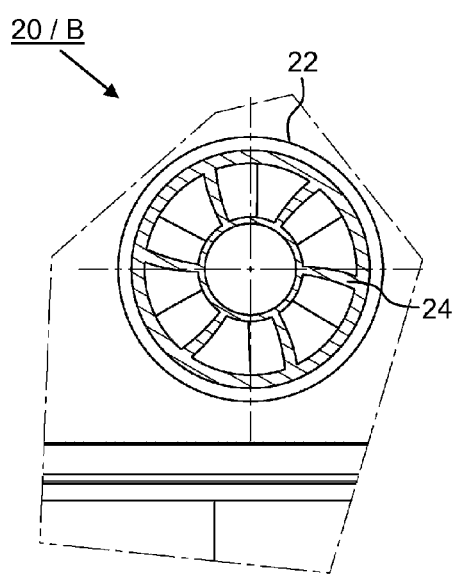
FIG. 2 is a detail view of the cyclone cell identified in FIG. 1 with reference character B.
Figure 3:
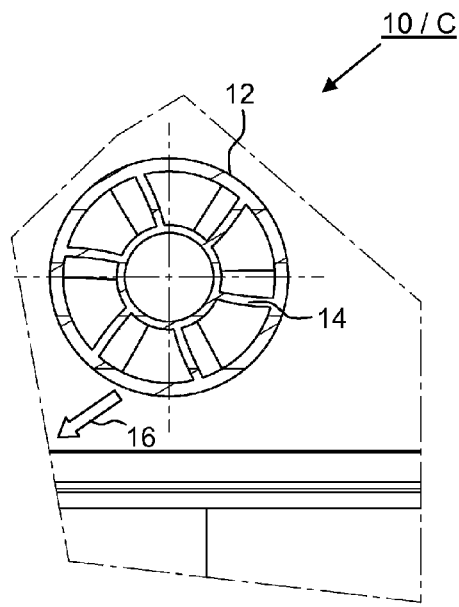
FIG. 3 is a detail view of the cyclone cell identified in FIG. 1 with reference character C.
Figure 4:
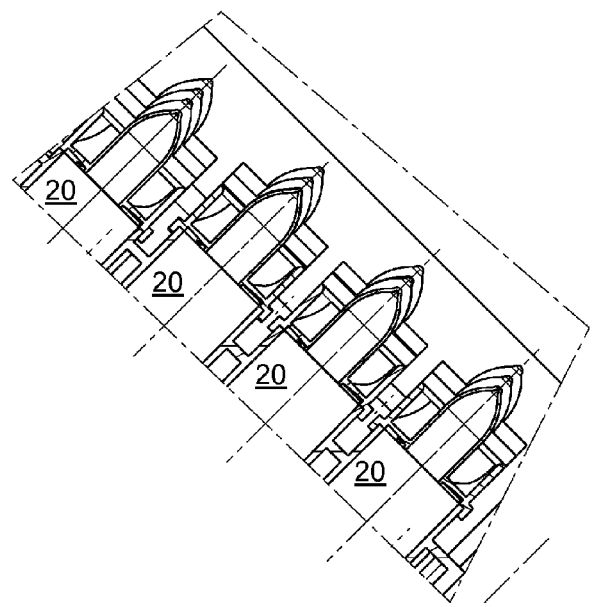
FIG. 4 shows the cyclone separator of FIG. 1 in section illustration along the line indicated in FIG. 1 by A-A.
Figure 5:
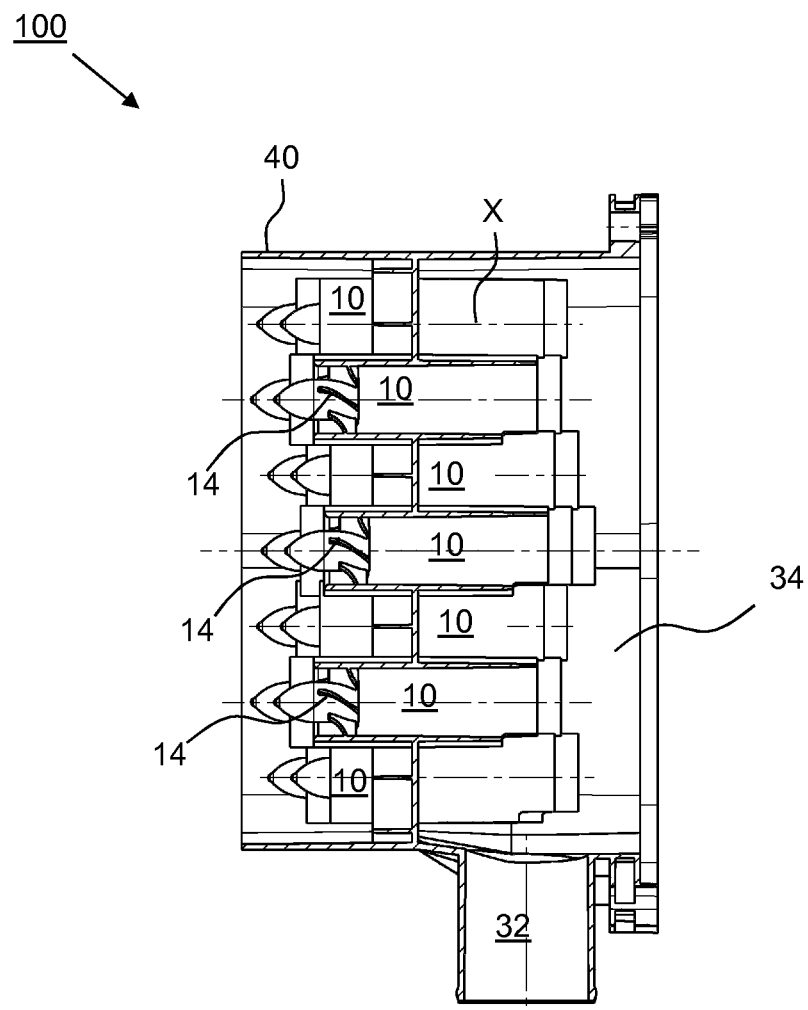
FIG. 5 shows the cyclone separator of FIG. 1 in cross-sectional illustration along the line indicated in FIG. 1 by D-D.

LIST OF REFERENCE CHARACTERS 10 non-counter-rotating first cyclone cell or non-counter-rotating individual cyclone
12 cell pipe of the non-counter-rotating first cyclone cell 10
14 guiding device of the non-counter-rotating first cyclone cell 10, in particular non-counter-rotating guiding device
16 ejection direction of the particles exiting from the non-counter-rotating first cyclone cell 10
20 counter-rotating second cyclone cell or counter-rotating individual cyclone
22 cell pipe of the counter-rotating second cyclone cell 20
24 guiding device of the counter-rotating second cyclone cell 20, in particular counter-rotating guiding device
30 particle outlet, in particular suction opening or discharge device, in particular arranged on a dust collecting chamber 34
32 further or second particle outlet, in particular further suction opening or further discharge device, in particular arranged on a dust collecting chamber 34
34 dust collecting chamber for particles exiting from the cyclone cells
40 housing
44 width of the housing
100 cyclone separator or centrifugal separator or centrifugal force separator or inertial separator, in particular multi-cell cyclone or multi-cyclone, for example, embodied as pre-separator for an air filter of a power engine
300 first alternative arrangement of a particle outlet, in particular suction opening or discharge device, in particular arranged on a dust collecting chamber 34
320 first alternative for arrangement of a further or second particle outlet, in particular further suction opening or further discharge device, in particular arranged on a dust collecting chamber 34
301 second alternative arrangement of a particle outlet, in particular suction opening or discharge device, in particular arranged on a dust collecting chamber 34
321 second alternative for arrangement of a further or second particle outlet, in particular further suction opening or further discharge device, in particular arranged on a dust collecting chamber 34
B second cyclone cell 20 of the cyclone separator 100 of FIG. 1 which is shown in FIG. 2 in detail and is preferably counter-rotating
C first cyclone cell 10 of the cyclone separator 100 of FIG. 1 which is shown in detail in FIG. 3 and is preferably non-counter-rotating
X longitudinal axis of the cell pipe 12

What is claimed is:

1. A cyclone separator for separating liquid and/or solid particles from a fluid, the cyclone separator comprising:
   three or more cyclone cells each comprising
   a cell pipe provided with a guiding device,
   wherein the cell pipe surrounds a longitudinal axis of the cyclone cell corresponding to a flow direction through the cyclone separator;
   wherein the guiding devices each are configured to cause the fluid to rotate about the longitudinal axis and to separate the particles from the fluid by rotation of the fluid, and
   wherein the cell pipes each comprise
   a particle exit opening for ejecting the particles that have been separated by rotation from the fluid;
   a housing surrounding and supporting the three or more cyclone cells, the housing including
   one or more particle outlets configured to discharge from the cyclone separator housing the particles that have exited from the cell pipes;
   wherein the three or more cyclone cells include first cyclone cells arranged side by side in a first group,
   wherein the guiding devices of the first cyclone cells are configured to cause the fluid to rotate in a first rotation direction,
   wherein a first particle outlet of the more particle outlets of the housing is offset horizontally in a direction traverse to a direction of gravity and traverse to the longitudinal axis from the first cyclone cells,
   and
   wherein the cyclone separator further includes one or more second cyclone cells configured as a counter-rotating cyclone cells and arranged side by side in a second group separate from the first group,
   wherein the guiding device of said counter-rotating cyclone cell is configured to cause the fluid to rotate in a second rotation direction opposite to the first rotation direction,
   wherein a second particle outlet of the one or more particle outlets of the housing is offset horizontally in a direction traverse to the direction of gravity and traverse to the longitudinal axis from the second cyclone cells,
   wherein particles exiting from the particle exit openings of the cell pipes of first cyclone cells are ejected to travel in a first horizontal direction, traverse to gravity and traverse to the longitudinal axis, towards the first particle outlet of the housing,
   wherein particles exiting from the particle exit openings of the cell pipes of second cyclone cells are ejected to travel in a different second horizontal direction, traverse to gravity and traverse to the longitudinal axis, towards the second particle outlet of the housing.

2. The cyclone separator according to claim 1, wherein a number of the one or more second cyclone cells and/or a position of the one or more second cyclone cells in the cyclone separator and an orientation of the particle exit openings of the cell pipes of the first cyclone cells are matched relative to each other such that particle accumulations in the cyclone separator are reliably prevented.

3. The cyclone separator according to claim 1, wherein the cyclone separator comprises an area located in an ejection direction of the particles that are exiting from the particle exit openings of the cell pipes of the first cyclone cells and
wherein the one or more second cyclone cells are arranged in said area of the cyclone separator.

4. The cyclone separator according to claim 1, wherein the particle exit openings of the cell pipes of the first cyclone cells and of the one or more second cyclone cells are oriented toward the one or more particle outlets.

5. The cyclone separator according to claim 1, wherein approximately one half of the three or more cyclone cells are in the form of the first cyclone cells and
approximately one half of the three or more cyclone cells are in the form of the one or more second cyclone cells.

6. The cyclone separator according to claim 1, wherein fewer of the one or more second cyclone cells than of the first cyclone cells are arranged in the cyclone separator.

7. The cyclone separator according to claim 1, wherein a number of the one or more second cyclone cells arranged in the cyclone separator relative to a number of the first cyclone cells arranged in the cyclone separator corresponds to a ratio of approximately one to ten up approximately one to one.

8. The cyclone separator according to claim 1, wherein an ejection direction of the particles exiting from the particle exit openings of the cell pipes of first cyclone cells and of the one or more second cyclone cells is oriented in a direction toward the one or more particle outlets.

9. The cyclone separator according to claim 1, wherein an ejection direction of the particles exiting from the particle exit openings of the cell pipes of the first cyclone cells and of the one or more second cyclone cells is oriented in a direction toward a center of the cyclone separator.

10. The cyclone separator according to claim 1, wherein the one or more particle outlets are distributed uniformly across one side of the housing.

11. The cyclone separator according to claim 10, wherein the housing comprises a long side and a short side,
wherein said one side of the housing is the long side of the housing.

12. The cyclone separator according to claim 1, wherein the housing comprises a long side and a short side,
wherein the one or more particle outlets are arranged centrally on the long side or on the short side.

13. The cyclone separator according to claim 1, wherein the three or more cyclone cells are oriented in a flow direction of the fluid passing through the cyclone separator and are arranged parallel to each other,
wherein the one or more particle outlets are oriented in a direction transverse to the flow direction of the fluid passing through the cyclone separator.

14. The cyclone separator according to claim 13, wherein the one or more particle outlets are oriented in a direction of gravity.

15. The cyclone separator according to claim 1 embodied as a pre-separator for an air filter system of a power engine or a compressed air compressor.

16. A filtering device comprising:

a filter housing with a raw-side inlet and a clean-side outlet for a medium to be filtered;

a cyclone separator according to claim 1 arranged at the raw-side inlet of the filter housing and configured as a prefilter.

* * * * *